United States Patent
Kwon et al.

(10) Patent No.: US 8,510,514 B2
(45) Date of Patent: Aug. 13, 2013

(54) APPARATUS, METHOD AND DATA PROCESSING ELEMENT FOR EFFICIENT PARALLEL PROCESSING OF MULTIMEDIA DATA

(75) Inventors: Young Su Kwon, Daejeon (KR); Bon Tae Koo, Daejeon (KR); Nak Woong Eum, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1480 days.

(21) Appl. No.: 12/112,156

(22) Filed: Apr. 30, 2008

(65) Prior Publication Data
US 2008/0270710 A1 Oct. 30, 2008

(30) Foreign Application Priority Data
Apr. 30, 2007 (KR) .................. 10-2007-0042190

(51) Int. Cl.
*G06F 12/00* (2006.01)
(52) U.S. Cl.
USPC .......................................... 711/147; 711/170
(58) Field of Classification Search
USPC .................................. 711/147, 170
See application file for complete search history.

(56) References Cited

U.S. PATENT DOCUMENTS

| | | | |
|---|---|---|---|
| 6,349,370 B1 * | 2/2002 | Imamura | 711/147 |
| 7,149,876 B2 | 12/2006 | Kirsch | |
| 2005/0160253 A1 | 7/2005 | De Lescure | |
| 2005/0254492 A1 | 11/2005 | Denneau et al. | |

FOREIGN PATENT DOCUMENTS

| | | |
|---|---|---|
| EP | 0930574 A2 | 7/1999 |
| KR | 1020050021233 A | 3/2005 |
| KR | 1020060121266 A | 11/2006 |
| WO | 2006/015868 A2 | 2/2006 |

* cited by examiner

*Primary Examiner* — Matthew Bradley
(74) *Attorney, Agent, or Firm* — Kile Park Reed & Houtteman PLLC (57) ABSTRACT

Provided are an apparatus, a method, and a data processing element (DPE) for efficient parallel processing of multimedia data. The DPE includes: a memory routing unit (MRU) comprising a shared memory page shared by the DPE and DPEs that are adjacent to the DPE, and a shared page switch selectively connecting the shared memory page to the DPE and the adjacent DPEs; and a data processing unit (DPU) comprising a virtual page for connecting the DPU to the shared memory page, and a dynamic remapper assigning the shared memory page to a DPE according to conditions that a series of tasks for processing multimedia data are performed in the DPE and the adjacent DPEs, and controlling the shared page switch according to the assigning. Accordingly, multimedia data can be efficiently processed in parallel by mapping a temporal and directional shared memory between DPEs.

19 Claims, 4 Drawing Sheets

APPARATUS, METHOD AND DATA PROCESSING ELEMENT FOR EFFICIENT PARALLEL PROCESSING OF MULTIMEDIA DATA

CROSS-REFERENCE TO RELATED PATENT APPLICATION

This application claims the benefit of Korean Patent Application No. 10-2007-0042190, filed on Apr. 30, 2007, in the Korean Intellectual Property Office, the disclosure of which is incorporated herein in its entirety by reference.

BACKGROUND OF THE INVENTION

1. Field of the Invention

The present invention relates to an apparatus, a method and a data is processing element (DPE) for efficient parallel processing of multimedia data, and more particularly, to a parallel data processing array including a plurality of DPEs for processing a massive amount of multimedia data, and an apparatus and a method for transferring a massive amount of data between each DPE.

This work was supported by the IT R&D program of MIC/IITA [2006-S-048-02, Embedded DSP Platform for Audio/Video Signal Processing].

2. Description of the Related Art

With developments in information technology (IT), the number of not only portable products, but also residential electronic products, which can process multimedia data, such as video and audio, has remarkably increased. The use of such multimedia products is expanding in various product groups related to DVD technology, MPEG-2 technology, moving image reproduction functions of mobile phones, HDTVs, etc. An image or audio file for a corresponding multimedia product includes a massive amount of data if it is raw data. For example, when each pixel of an image having a screen size of 1920×1200 is expressed in 24-bit, transmission performance of 1.66 Gbps is required in order to transmit 30 frames per second in a continuous serial bitstream. As the frame rate increases, better transmission performance is required, and thus most images and sounds are transferred after those are compressed by an advanced compression technology.

Various compression technologies of multimedia data exist, including MPEG-2, MPEG-4, H.264, bit sliced arithmetic coding (BSAC), advanced audio coding plus (AAC+), etc. Hardware having a function of coding and decoding an image is required so as to enable the use of such compression technologies. Most mobile and residential multimedia devices include very large scale integration (VLSI) for a multimedia codec in order to perform coding and decoding in real time.

Performance of VLSI for a codec differs according to the complexity or characteristics of a codec algorithm. Recent multimedia codecs require a data processing performance of 0.6 giga instructions per second (GIPS) to 1.5 GIPS, and in several years from now, it is predicted that multimedia codecs will require a data processing performance of 2 GIPS to 5 GIPS. Accordingly, a high performance chip for codecs is required.

When various kinds of multimedia codecs are embodied as hardware within a short period of time, a processor array structure or a parallel processing system is used in order to realize high performance. A programmable processor can be embodied as various multimedia codecs within a short period of time, but processing speed of the programmable processor decreases. A programmable processor having an array structure for overcoming such a disadvantage can process multimedia data in parallel, and thus can effectively and efficiently process the multimedia data.

While processing multimedia data, the same operation is repeatedly performed on a series of data streams, and thus a parallel processing can be easily adopted for processing multimedia data. The parallel processing means that tasks for processing data are independently assigned to each processor, and the assigned tasks are simultaneously performed.

There is a need for an efficient structure of each of a plurality of data processing elements (DPEs) constituting a processor array and a method of efficiently interconnecting each DPE in order that the processor array can effectively and efficiently process multimedia data.

SUMMARY OF THE INVENTION

The present invention provides a data processing element (DPE) for efficient parallel processing of multimedia data in a parallel data processing array including a plurality of DPEs, wherein the DPE has a structure of mapping a temporal and directional shared memory between each of the DPEs.

The present invention also provides a data processing apparatus used in a DPE for efficient parallel processing of multimedia data.

The present invention also provides a data processing method in a parallel data processing array for efficient parallel processing of multimedia data.

The present invention also provides a data processing method in a DPE of a parallel data processing array for efficient parallel processing of multimedia data.

According to an aspect of the present invention, there is provided a data processing element (DPE) of a parallel data processing system comprising a plurality of DPEs for efficient parallel processing of multimedia data, the DPE comprising: a memory routing unit (MRU) comprising a shared memory page shared by the DPE and DPEs which are adjacent to the DPE, and a shared page switch selectively connecting the shared memory page to the DPE and the adjacent DPEs; and a data processing unit (DPU) comprising a virtual page for connecting the DPU to the shared memory page, and a dynamic remapper assigning the shared memory page to a DPE according to conditions that a series of tasks for processing multimedia data are performed in the DPE and the adjacent DPEs, and controlling the shared page switch according to the assigning.

The DPE may further comprise: a plurality of connection units comprising a memory connection line for sharing the shared memory page with each of the adjacent DPEs, and a message transmission line for announcing conditions that a task is performed in each of the adjacent DPEs. The DPE may comprise four connection units that are adjacent to the adjacent DPEs in four directions of north (N), west (W), south (S) and east (E).

The dynamic remapper controls the shared page switch so that data generated by a first DPE of the adjacent DPEs, which performs a task prior to a task performed by the DPE, is stored in the shared memory page, and so that data generated by the DPE is stored in a shared memory page of a second DPE of the adjacent DPEs, which performs a task subsequent to the task performed by the DPE.

The DPU may further comprise: a data processing core performing a data-processing instruction and calculation; and a memory arbiter accessing a memory required for an operation of the data processing core.

The shared memory page may comprise at least two shared memory pages, and the shared page switch may comprise at least two switches connecting the shared memory pages, and a switch connecting the virtual page to the adjacent DPEs.

According to another aspect of the present invention, there is provided data processing apparatus for efficient parallel processing of multimedia data in a DPE of a parallel processing system comprising a plurality of DPEs, the apparatus comprising; a virtual page which is selectively connected to one of shared memory pages in the DPE or adjacent DPEs; and a dynamic remapper assigning a shared memory page to the virtual page or one of the adjacent DPEs according to conditions that a series of tasks for processing multimedia data are processed in the DPE and the adjacent DPEs.

The dynamic remapper may remaps the shared memory page of the DPE so that data generated by a first DPE of the adjacent DPEs, which performs a task prior to a task performed by the DPE, is stored in the shared memory page of the DPE, and assigns the virtual page to a second DPE of adjacent DPEs so that data generated by the DPE is stored in a shared memory page of the second DPE, which performs a task subsequent to the task performed by the DPE.

The apparatus may further comprise: a data processing core performing a data-processing instruction and calculation; and a memory arbiter accessing a memory required for an operation of the data processing core.

According to another aspect of the present invention, there is provided a method of processing data in a parallel processing system comprising a plurality of DPEs, wherein each DPE comprises a shared memory page shared by the DPE and DPEs that are adjacent to the DPE, the method comprising: dividing a multimedia data processing algorithm into at least two sub-blocks that can be processed in parallel; assigning a series of tasks for processing the sub-blocks to the DPE and the adjacent DPEs considering the positions at which the adjacent DPEs are disposed with respect to the DPE, according to a performing order of the tasks; and dynamically remapping the shared memory pages of the DPE and the adjacent DPEs according to conditions that the tasks are performed.

The dynamically remapping may further comprise: remapping a shared memory page of the DPE so that data generated by a first DPE of the adjacent DPEs, which performs a task prior to a task performed by the DPE, is stored in the shared memory page of the DPE; and remapping a shared memory page of a second DPE of the adjacent DPEs so that data generated by the DPE is stored in the shared memory page of the second DPE, which performs a task subsequent to the task performed by the DPE.

According to another aspect of the present invention, there is provided a data processing method in a DPE of a parallel processing system when the parallel processing system divides a multimedia data processing algorithm into a series of at least two tasks and performs the tasks in parallel, wherein the parallel processing system comprises a plurality of DPEs, and the DPE comprises a shared memory page shared by the DPE and DPEs that are adjacent to the DPE, the method comprising: importing data stored in the shared memory page of the DPE and performing a task assigned to the DPE; assigning a shared memory page of a first DPE of the adjacent DPEs so that data generated by the DPE is stored in the shared memory page of the first DPE of the adjacent DPEs, which performs a task subsequent to a task performed by the DPE; and storing the data generated by the DPE in the assigned shared memory page.

The method may further comprise: determining whether a task of a second DPE of the adjacent DPEs is completed, wherein the task is a task prior to a task performed by the DPE, before importing data stored in the shared memory page of the DPE; and determining whether a task of the first DPE is completed, after performing a task assigned to the DPE.

According to another aspect of the present invention, there is provided a method of processing multimedia data of a DPE in a data parallel processing system comprising a plurality of DPEs, the method comprising: remapping shared memory pages according to conditions that data is processed by the DPE and the adjacent DPEs; and selectively connecting a remapped shared memory page to one of the adjacent DPEs so that the adjacent DPEs access to the shared memory pages.

The remapping may further comprise: assigning one of the shared memory pages to a first DPE of the adjacent DPEs so that data generated by the first DPE, which performs a task prior to a task performed by the DPE, is stored in the DPE; and assigning one of the shared memory pages to a second DPE of the adjacent DPEs so that data generated by the DPE is used in the second DPE, which performs a task subsequent to a task performed by the DPE.

The method further comprising: connecting the DPE to a remapped shared memory page of a third DPE of the adjacent DPEs so that data generated by the DPE is stored in the third DPE, which performs a task subsequent to a task performed by the DPE.

The method further comprising: remapping a virtual page according to conditions that data are processed by the DPE and the adjacent DPEs; and selectively connecting the virtual page to one of the adjacent DPEs so that the DPE accesses to a shared memory page of the connected adjacent DPE.

According to another aspect of the present invention, there is provided a DPE in a parallel processing system comprising a plurality of DPEs for parallel processing multimedia data, the DPE comprising: a data processing unit (DPU) remapping shared memory pages so that data is shared by a DPE and adjacent DPEs according to conditions that data is processed by the DPE and the adjacent DPEs; and a memory routing unit (MRU) selectively connecting a remapped shared memory page to one of the adjacent DPEs so that the adjacent DPEs access to the shared memory pages.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described more fully with reference to the accompanying drawings, in which exemplary embodiments of the invention are shown. In the drawings, like reference numerals denote like elements. Also, while describing the present invention, detailed descriptions about conventional functions or configurations that may diminish the clarity of the points of the present invention, which are related to the present invention, are omitted.

Figure 1:
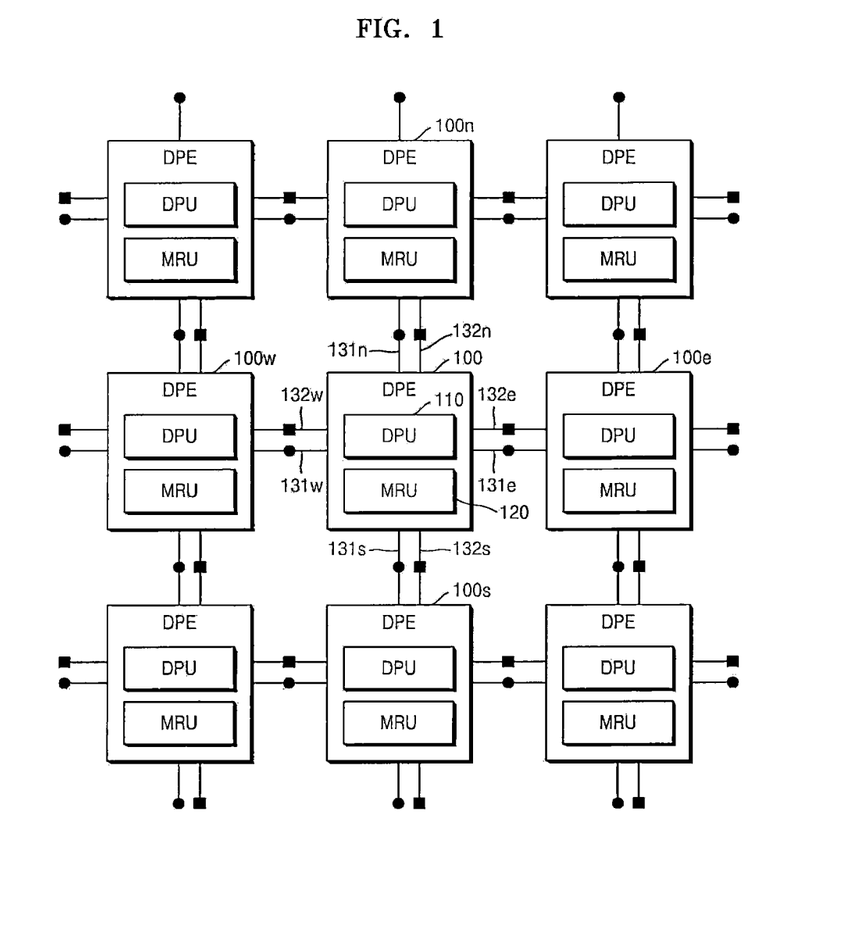
FIG. 1 is a diagram illustrating a parallel data processing system according to an embodiment of the present invention.

FIG. 1 is a diagram illustrating a parallel data processing system according to an embodiment of the present invention.

Referring to FIG. 1, the parallel data processing system—the parallel data processing array—according to the current embodiment of the present invention includes a plurality of data processing elements (DPEs) 100, 100n, 100w, 100s and 100e.

The DPE 100 includes a data processing unit (DPU) 110 and a memory routing unit (MRU) 120. The DPU 110 of the DPE 100 processes data in parallel. However, the DPU 110 is configured in order to process a series of processes organically in connection with, MRUs included in the DPEs 100n, 100w, 100s and 100e, which are adjacent to the DPE 100, rather than using only data in the MRU 120 included in the DPE 100. Similarly, the MRU 120 is appropriately configured so that the DPU 110 processes data in connection with the MRUs included in the adjacent DPEs 100n, 100w, 100s and 100e. The internal structure of the DPE 100 will be described in detail with reference to FIG. 2.

In terms of the DPE 100, the DPE 100 includes the DPU 110 and the MRU 120, and has shared memory connection lines 131n, 131w, 131s and 131e and message transmission lines 132n, 132w, 132s and 132e, which respectively connect the DPE 100 to the adjacent DPEs 100n, 100w, 100s and 100e.

The shared memory connection lines 131n, 131w, 131s and 131e respectively connect a shared memory in the DPE 100 to the adjacent DPEs 100n, 100w, 100s and 100e. The shared memory connection lines 131n, 131w, 131s and 131e are a group of connection lines for memory access to address, data, enable (EN), read/write (RW), and the like.

The shared memory connection line 131n, which is disposed at a north side (N-side) of the DPE 100, is connected to a south side (S-side) of the DPE 100n, which is disposed above the DPE 100. Likewise, the shared memory connection line 131w, which is disposed at a west side (W-side) of the DPE 100, is connected to an east side (E-side) of the DPE 100w, which is disposed on the left of the DPE 100. The shared memory connection line 131s, which is disposed at a south side (S-side) of the DPE 100, is connected to an N-side of the DPE 100s, which is disposed below the DPE 100. The shared memory connection line 131e, which is disposed at an E-side of the DPE 100, is connected to a W-side of the DPE 100e, which is disposed on the right of the DPE 100.

The message transmission lines 132n, 132w, 132s and 132e transmit and receive messages to and from the adjacent DPEs 100n, 100w, 100s and 100e, respectively. The message transmission lines 132n, 132w, 132s and 132e are a group of connection lines for L2Ren (left to right enable), L2RMsg (left to right message), R2Len (right to left enable), R2LMsg (right to left message), and the like.

The DPE 100 includes the message transmission lines 132n, 132w, 132s and 132e for transmitting and receiving messages to and from the adjacent DPEs 100n, 100w, 100s and 100e. In this regard, the message transmission line 132n, which is disposed at an N-side of the DPE 100, is connected to an S-side of the DPE 100n. Likewise, the message transmission line 132w, which is disposed at a W-side of the DPE 100, is connected to an E-side of the DPE 100w. The message transmission line 132s, which is disposed at an S-side of the DPE 100, is connected to an N-side of the DPE 100s. The message transmission line 132e, which is disposed at an E-side of the DPE 100w of the DPE 100, is connected to a W-side of the DPE 100e.

As a result of the above structure, the DPE 100 can be connected to the adjacent DPEs 100n, 100w, 100s and 100e, which are disposed at the north, west, south and east (N, W, S and E) of the DPE 100, respectively, and can extend to constitute a arbitrary M×N data processing array.

Likewise, due to directivity in four directions of the DPE 100, the DPE 100 can be easily connected to the adjacent DPEs 100n, 100w, 100s and 100e, and can be suitable for performing various multimedia processing functions. For example, the parallel data processing system according to the current embodiment of the present invention may be used in processing data according to a level in a direction from the north to the south (N→S), and according to a time sequence in a direction from the west to the east (W→E).

The DPE 100 is connected in four directions, but the present invention is not limited thereto. That is, it will be understood by one of ordinary skill in the art that the numbers of shared memory connection lines and message transmission lines can increase or decrease according to the system while the directivity of the DPE 100 is maintained, thereby increasing or decreasing the number of connection directions.

Figure 2:
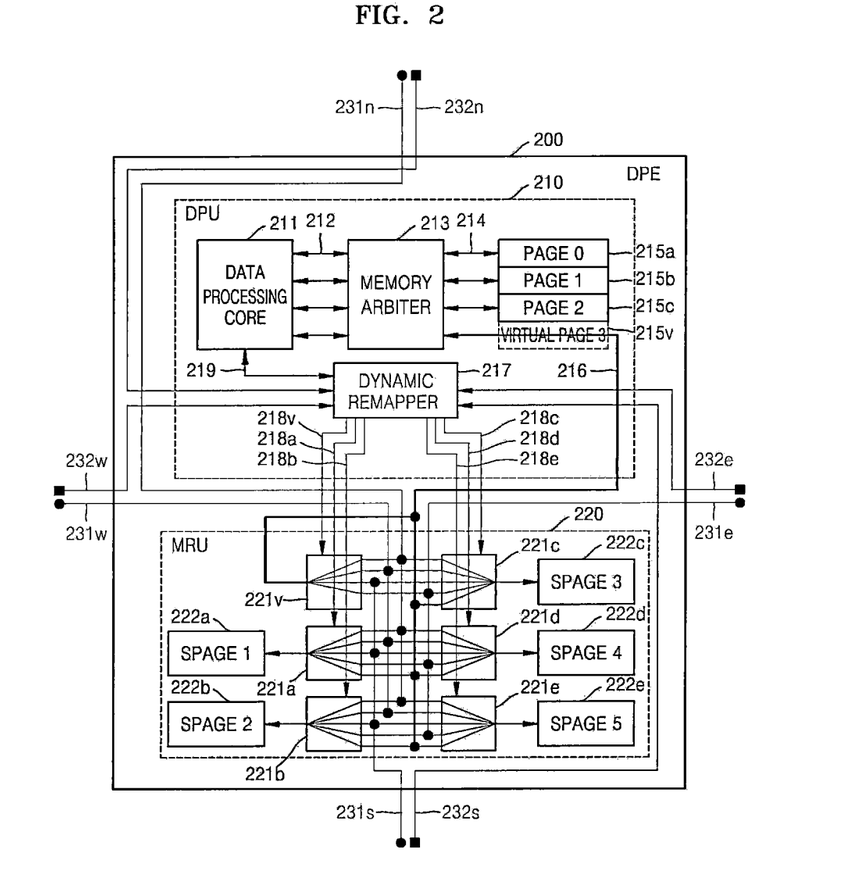
FIG. 2 is a diagram illustrating an internal structure of a data processing element (DPE) according to an embodiment of the present invention.

FIG. 2 is a diagram illustrating an internal structure of a DPE 200 according to an embodiment of the present invention. That is, the internal structure of the DPE 200 included in a parallel data processing array will now be described.

Referring to FIG. 2, the DPE 200 according to the current embodiment of the present invention includes a DPU 210 and a MRU 220. In addition, the DPE 200 includes connection units 231n and 232n, 231w and 232w, 231s and 232s, and 231e and 232e for sharing shared memory pages 1 through 5 222a through 222e with DPEs that are adjacent to the DPE 200.

The DPU 210 includes a data processing core 211 performing a data-processing instruction and calculation, a memory arbiter 213 accessing a memory required for an operation of the data processing core 211, a virtual page 215v for connecting the DPU 210 to shared memory pages 1 through 5 222a through 222e, and a dynamic remapper 217 controlling shared page switches 221a through 221e and 221v.

In particular, the dynamic remapper 217 controls the shared page switches 221a through 221e and 221v so that data generated by a first DPE of the adjacent DPEs, which performs a task prior to a task performed by the DPE 200, may be stored in the shared memory pages 1 through 5 222a through 222e. In addition, the dynamic remapper 217 controls the shared page switches 221a through 221e and 221v so that data generated by the DPE 200 may be stored in a shared memory page of a second DPE of the adjacent DPEs, which performs a task subsequent to the task performed by the DPE 200.

The MRU 220 includes the shared memory pages 1 through 5 222a through 222e that are shared by the DPE 200 and the adjacent DPEs, and the shared page switches 221a through 221e and 221v that selectively connect the shared memory pages 1 through 5 222a through 222e to each DPE. The number of the shared memory pages 1 through 5 222a through 222e can increase or decrease according to the system.

The DPE 200 includes the connection units 231n and 232n, 231w and 232w, 231s and 232s, and 231e and 232e that are adjacent to the adjacent DPEs to the north (N), west (W), south (S) and east (E), respectively.

The DPE 200 will now be described in more detail.

The DPU 210 includes the data processing core 211, the memory arbiter 213, local memory pages 215a through 215c, the virtual page 215v, and the dynamic remapper 217.

The data processing core 211 is a core of a digital signal processor (DSP), except for a portion in relation to a memory. The data processing core 211 includes an instruction generator, a data address generator, and an execution unit. The data processing core 211 accesses four memory buses 212 at each clock cycle in order to fetch an instruction, a left operand and a right operand, and to write an execution result.

The memory arbiter 213 arbitrates memory accesses requested by the data processing core 211 so as to connect the data processing core 211 to memory pages 215a through 215c. The memory arbiter 213 manages the local memory pages 215a through 215c which are physical memory pages of a local region and the virtual page 215v.

Instructions and local data, which are processed in the data processing core 211, are stored in the local memory pages 215a through 215c. The virtual page 215v is a memory block that does not physically exist. The virtual page 215v is connected to one of the shared memory pages 1 through 5 222a through 222e which physically exist, or are connected to a shared memory page of the adjacent DPEs through the shared memory connection lines 231n, 231w, 231s and 231e. Multimedia data, which is to be transmitted by the data processing core 211 to a data processing core of a first DPE of the adjacent DPEs, or multimedia data, which is to be received by the data processing core 211 from a second DPE of the adjacent DPEs, is stored in the shared memory pages 1 through 5 222a through 222e.

The MRU 220 includes the shared memory pages 1 through 5 222a through 222e, which are five physical pages, five shared page switches 221a through 221e for respectively connecting the shared memory pages 1 through 5 222a through 222e to the DPE 200 or one of the adjacent DPEs, and the shared page switch 221v for connecting the virtual page 215v to a shared memory page of one of the adjacent DPEs.

In the above description, there are five shared memory pages 222a through 222e, but one of ordinary skill in the art would know that the number of shared memory pages could increase or decrease according to the system.

The shared page switch 221v for connecting the virtual page 215v to a shared memory page of one of the adjacent DPEs connects the shared memory connection lines 231n, 231w, 231s and 231e, which respectively correspond to north, west, south and east, to the virtual page 215v, which is not a physical shared memory, unlike in the cases of the shared page switches 221a through 221e. That is, the virtual page 215v may be connected to a physical shared memory page of one of the adjacent DPEs through the shared page switch 221v. By the virtual page 215v and the shared page switch 221v, the data processing core 211 can write and read data to and from a shared memory page of one of the adjacent DPEs.

The shared memory page 1 222a is associated with the shared page switch 221a. That is, the shared memory page 1 222a may be connected to one of the shared memory connection lines 231n, 231w, 231s and 231e or the virtual page 215v through the shared page switch 221a. The shared page switch 221a functions as a 5:1 bidirectional multiplexer (MUX). Thus, the shared memory page 1 222a may be used by the DPE 200, or may be used by the adjacent DPEs.

Such connections applied to the case of the shared memory page 1 222a can be similarly applied to the case of shared memory pages 2 through 5 222b through 222e. That is, the shared memory pages 2, 3, 4 and 5 222b, 222c, 222d and 222e are associated with shared page switches 221b, 221c, 221d and 221e, respectively. In addition, each of the shared memory pages 2, 3, 4 and 5 222b, 222c, 222d and 222e may be connected to one of the shared memory connection lines 231n, 231w, 231s and 231e and the virtual page 215v.

The dynamic remapper 217 and the data processing core 211 dynamically determine which one of the shared memory pages 222a through 222e and the shared memory connection lines 231n, 231w, 231s and 231e is connected to the virtual page 215v by the shared page switch 221v.

In addition, the dynamic remapper 217 and the data processing core 211 dynamically determine which one of the shared memory connection lines 231n, 231w, 231s and 231e, and the virtual page 215v is connected to each of the shared memory pages 1 through 5 222a through 222e by each of the shared page switches 221a through 221e.

The dynamic remapper 217 is connected to message transmission lines 132n, 132w, 132s and 132e for transmitting and receiving messages to and from the adjacent DPEs. The dynamic remapper 217 has respective data queues with respect to the message transmission lines 132n, 132w, 132s and 132e. When messages are transmitted from the adjacent DPEs through the message transmission lines 132n, 132w, 132s and 132e, the messages are stored in the respective data queues, and then an interrupt is generated by the dynamic remapper 217 through a line 219 connected to the data processing core 211. When the interrupt is generated by the dynamic remapper 217, the data processing core 211 confirms the messages, and then can confirm the current data processing condition of data processing cores included in the adjacent DPEs, based on the messages.

The data processing core 211 confirms an algorithm processing condition performed by the data processing core 211 and the data processing conditions of data processing cores included in the adjacent DPEs. Then, the data processing core 211 determines whether to perform memory remapping of the shared memory pages 1 through 5 222a through 222e. After determining whether to perform memory remapping, the data processing core 211 transmits an instruction for memory remapping to the dynamic remapper 217 through the line 219.

The dynamic remapper 217 remaps the shared page switch 221v through a switch control line 218v, based on the instruction received from the data processing core 211. Likewise, the dynamic remapper 217 remaps the shared page switches 221a through 221e through switch control lines 218a through 218e, respectively.

According to the current embodiment of the present invention, the DPE 200 can use a shared memory page of one of the adjacent DPEs, and the parallel data processing array including the DPE can have a structure of mapping a temporal and directional shared memory. In this case, the performance and the use of the parallel data processing array can be maximized. For example, data can be transmitted and received between processors by using only memory remapping. This will be described in more detail with reference to FIGS. 3 and 4.

Figure 3:
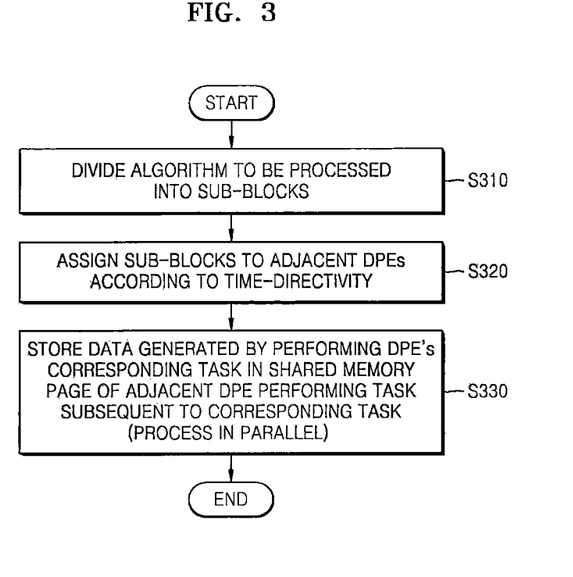
FIG. 3 is a flow chart illustrating a method of processing data in a parallel data processing system, according to an embodiment of the present invention.

FIG. 3 is a flow chart illustrating a method of processing data in a parallel data processing system, according to an embodiment of the present invention.

Referring to FIG. 3, the method of processing data according the current embodiment of the present invention is performed in a parallel data processing system including a plurality of DPEs, wherein each DPE shares its shared memory page with adjacent DPEs that are adjacent to the DPE, like in the case of the parallel data processing system of FIG. 1.

The method of processing data according to the current embodiment of the present invention is performed as follows: a multimedia data processing algorithm is divided into at least two sub-blocks that can be processed in parallel in operation S310; a series of tasks for processing the divided sub-blocks are assigned to a corresponding DPE and adjacent DPEs, which are adjacent to the corresponding DPE, considering the positions at which the adjacent DPEs are disposed with respect to the corresponding DPE, according to a performing order of the tasks in operation S320; and then shared memory pages included in the corresponding DPE and the adjacent DPEs are dynamically remapped according to conditions that the tasks are performed in operation S330.

Preferably, the operation S330 may include: remapping the shared memory pages of the corresponding DPE and the adjacent DPEs so that data generated by a first DPE of the adjacent DPEs is stored in a corresponding shared memory page included in the corresponding DPE, wherein the first DPE of the adjacent DPEs performs a task prior to a task performed by the corresponding DPE; and remapping the shared memory pages of the corresponding DPE and the adjacent DPEs so that data generated by the corresponding DPE is stored in a shared memory page included in a second DPE of the adjacent DPEs, wherein the second DPE of the adjacent DPEs performs a task subsequent to the task performed by the corresponding DPE.

Hereinafter, the method of processing data will be described in more detail as an example. In order to describe the above in more detail with reference to FIGS. 1 and 2, it is assumed that the internal structure of the DPE 100 illustrated in FIG. 1 is the same as that of the DPE 200 of FIG. 2

A general multimedia data processing algorithm can be divided into sub-blocks. For example, a predetermined algorithm can be divided into sub-blocks A, B and C that are sequentially connected as A→B→C. If a digital signal processor (DSP) performs all tasks corresponding to the sub-blocks A, B and C, the DSP needs to calculate both outputs of the sub-blocks A and B in order to obtain an output of the sub-block C that is a final output.

Assume that a multimedia data processing algorithm including tasks connected as A→B→C is assigned to respective DPEs. In FIG. 1, it is assumed that the DPEs 100w, 100 and 100e perform tasks A, B and C, respectively.

Initially, a virtual page of the DPE 100w is connected to an east shared memory connection line of the DPE 100w through a shared page switch, and the east shared memory connection line of the DPE 100w is connected to a west shared memory connection line 131w or 231w of the DPE 100, and then the west shared memory connection line 131w or 231w of the DPE 100 is connected to the shared memory page 1 222a of the DPE 100 through the shared page switch 221a of the DPE 100. A data processing core included in the DPE 100w stores the result of performing the task A in the shared memory page 1 222a included in the DPE 100, and notifies the data processing core 211 through a message transmission line 132w or 232w that the task A is completed.

The data processing core 211 of the DPE 100 transmits an instruction to the dynamic remapper 217 included in the DPE 100 so that the shared memory page 1 222a is connected to the virtual page 215v and simultaneously the west shared memory connection line 131w or 231w of the DPE 100 is connected to the share memory page 2 222b through the shared page switch 221b. In addition, the data processing core 211 notifies the DPE 100w through the message transmission line 132w or 232w that memory remapping is completed.

Then, while performing the task B, the data processing core 211 of the DPE 100 processes data stored in the shared memory page 1 222a, and stores the result of processing the data in a shared memory page of the DPE 100e.

While the data processing core 211 of the DPE 100 is performing the task B, a data processing core included in the DPE 100w performs the task A, and stores the result of performing the task A in the shared memory page 2 222b of the DPE 100.

While the DPE 100 and the DPE 100w are performing the tasks A and B respectively, the DPE 100e performs the task C according to the above-described process.

According to the above-described process, the tasks A, B and C are simultaneously performed by the DPEs 100w, 100 and 100e, respectively, and thus throughput is increased by about three times as compared with the case when sub-blocks of an algorithm are processed in a single processor.

In addition, since the temporal and directional shared memory structure connects the shared memory pages 1 through 5 222a through 222e of the DPE 100 to a virtual page of the adjacent DPEs while the shared memory pages 1 through 5 222a through 222e of the DPE 100 are being dynamically remapped, a massive amount of data can be transferred between DPEs. That is, a massive amount of data can be actually transferred by using only memory remapping.

Figure 4:
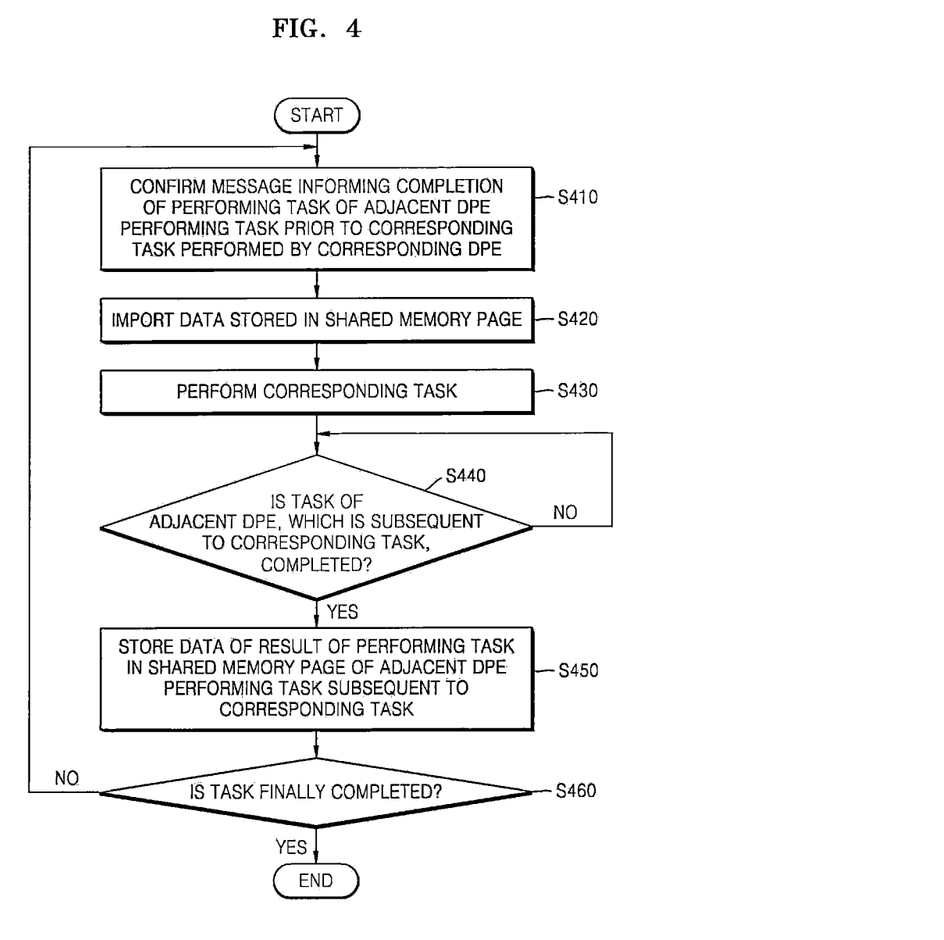
FIG. 4 is a flow chart illustrating a method of processing data in a DPE of a parallel data processing system, according to an embodiment of the present invention.

FIG. 4 is a flow chart illustrating a method of processing data in a DPE of a parallel data processing system, according to an embodiment of the present invention.

Referring to FIG. 4, the method of processing data according to the current embodiment of the present invention is performed in each of a plurality of DPEs included in the parallel data processing system when the parallel data processing system divides a multimedia data processing algorithm into a series of at least two tasks and performs the task in parallel, wherein each DPE shares a shared memory page with adjacent DPEs, which are adjacent to the DPE, like in the case of the parallel data processing system of FIG. 1.

The method of processing data according to the current embodiment of the present invention is performed as follows: data stored in a corresponding shared memory page of a corresponding DPE is imported in operation S420; a task assigned to the corresponding DPE is performed in operation S430; a shared memory page of a first DPE of adjacent DPEs which are adjacent to the corresponding DPE is assigned so that data generated by the corresponding DPE is stored in the shared memory page of the first DPE of the adjacent DPEs, wherein the first DPE of the adjacent DPEs performs a task subsequent to a task performed by the corresponding DPE, in operation S450; and the data generated by the corresponding DPE is stored in the shared memory page assigned by the above memory remapping.

In order to synchronize between DPEs, the method of processing data according to the current embodiment of the present invention further includes: determining whether a task performed by a second DPE of the adjacent DPEs is completed, wherein the task is a task prior to the task performed by the corresponding DPE, in operation S410; and determining whether a task performed by the first DPE of the adjacent DPEs is completed, wherein the task is a task subsequent to the task performed by the corresponding DPE, in operation S450.

As described above, a massive amount of data can be transferred, without any separate data transmission process between DPEs, by performing memory remapping until the tasks are finally completed in operation S450. Also, independent tasks can be performed by using the memory remapping, without changing a program performed by a processor core of each DPE.

It will be obvious to one of ordinary skill in the art that the method can be applied not only to an apparatus for data transmission, but also to a parallel data processing array, which is realized to quickly transmit a massive amount of data between two DPEs and includes the apparatus.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

According to the present invention, multimedia data can be efficiently processed in parallel by mapping a temporal and directional shared memory between DPEs.

Also, a massive amount of data can be transferred between DPEs by using a structure connecting a shared memory page included in a corresponding DPE to a virtual page of one of adjacent DPEs while the shared memory page of the corresponding DPE is being dynamically remapped. Consequently, a massive amount of data can be transferred between DPEs by using only memory remapping.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A data processing element (DPE) of a parallel data processing system comprising a plurality of DPEs for efficient parallel processing of multimedia data, the DPE comprising:
   a memory routing unit (MRU) comprising a shared memory page shared by the DPE and DPEs which are adjacent to the DPE, and a shared page switch selectively connecting the shared memory page to the DPE and the adjacent DPEs; and
   a data processing unit (DPU) comprising a virtual page for connecting to one among the shared memory pages of the DPE and the adjacent DPEs, and a dynamic remapper assigning the shared memory page to a DPE according to conditions that a series of tasks for processing multimedia data are performed in the DPE and the adjacent DPEs, and controlling the shared page switch according to the assigning.

2. The DPE of claim 1, further comprising:
   a plurality of connection units comprising a memory connection line for sharing the shared memory page with each of the adjacent DPEs, and a message transmission line for announcing conditions that a task is performed in each of the adjacent DPEs.

3. The DPE of claim 2, wherein the DPE comprises four connection units that are adjacent to the adjacent DPEs in four directions of north (N), west (W), south (S) and east (E).

4. The DPE of claim 1, wherein the dynamic remapper controls the shared page switch so that data generated by a first DPE of the adjacent DPEs, which performs a task prior to a task performed by the DPE, is stored in the shared memory page, and so that data generated by the DPE is stored in a shared memory page of a second DPE of the adjacent DPEs, which performs a task subsequent to the task performed by the DPE.

5. The DPE of claim 1, wherein the DPU further comprises:
   a data processing core performing a data-processing instruction and calculation; and
   a memory arbiter accessing a memory required for an operation of the data processing core, wherein the memory arbiter manages the shared memory page and one or more local memory pages.

6. The DPE of claim 1, wherein the shared memory page comprises at least two shared memory pages, and the shared page switch comprises at least two switches connecting the shared memory pages, and a switch connecting the virtual page to the DPE and the adjacent DPEs.

7. A data processing apparatus for efficient parallel processing of multimedia data in a DPE of a parallel processing system comprising a plurality of DPEs, the apparatus comprising:
   one or more local memory pages comprising instructions and local data;
   a virtual page which is selectively connected to one among shared memory pages in the DPE and adjacent DPEs; and
   a dynamic remapper assigning a shared memory page to the virtual page or one of the adjacent DPEs according to conditions that a series of tasks for processing multimedia data are processed in the DPE and the adjacent DPEs.

8. The apparatus of claim 7, wherein the dynamic remapper remaps the shared memory page of the DPE so that data generated by a first DPE of the adjacent DPEs, which performs a task prior to a task performed by the DPE, is stored in the shared memory page of the DPE, and assigns the virtual page to a second DPE of the adjacent DPEs so that data generated by the DPE is stored in the shared memory page of the second DPE, which performs a task subsequent to the task performed by the DPE.

9. The apparatus of claim 7, further comprising:
   a data processing core performing a data-processing instruction and calculation; and
   a memory arbiter accessing a memory required for an operation of the data processing core, wherein the memory arbiter manages the virtual page and the one or more local memory pages.

10. A method of processing data in a parallel processing system comprising a plurality of DPEs, wherein each DPE comprises one or more local memory pages and a shared memory page shared by the DPE and DPEs that are adjacent to the DPE, the method comprising:
    dividing a multimedia data processing algorithm into at least two sub-blocks that can be processed in parallel;
    assigning a series of tasks for processing the sub-blocks to the DPE and the adjacent DPEs considering the directions at which the adjacent DPEs are disposed with respect to the DPE, according to a performing order of the tasks; and
    dynamically remapping the shared memory pages of the DPE and the adjacent DPEs according to conditions that the series of tasks are performed in the DPE and the adjacent DPEs.

11. The method of claim 10, wherein the dynamically remapping further comprising:
    remapping a shared memory page of the DPE so that data generated by a first DPE of the adjacent DPEs, which performs a task prior to a task performed by the DPE, is stored in the shared memory page of the DPE; and
    remapping a shared memory page of a second DPE of the adjacent DPEs so that data generated by the DPE is stored in the shared memory page of the second DPE, which performs a task subsequent to the task performed by the DPE.

12. A data processing method in a DPE of a parallel processing system when the parallel processing system divides a multimedia data processing algorithm into a series of at least two tasks and performs the tasks in parallel, wherein the parallel processing system comprises a plurality of DPEs, and the DPE comprises one or more local memory pages and a shared memory page shared by the DPE and DPEs that are adjacent to the DPE, the method comprising:

importing data stored in the shared memory page of the DPE and performing a task assigned to the DPE;

remapping a shared memory page of a first DPE of the adjacent DPEs so that data generated by the DPE is stored in the shared memory page of the first DPE of the adjacent DPEs, which performs a task subsequent to a task performed by the DPE; and storing the data generated by the DPE in the remapped shared memory page.

13. The method of claim 12, further comprising:

determining whether a task of a second DPE of the adjacent DPEs is completed, wherein the task is a task prior to a task performed by the DPE, before importing data stored in the shared memory page of the DPE; and determining whether a task of the first DPE is completed, after performing a task assigned to the DPE.

14. A method of processing multimedia data of a DPE in a parallel processing system comprising a plurality of DPEs, the DPE comprises one or more local memory pages and a shared memory page shared by the DPE and DPEs that are adjacent to the DPE, the method comprising:

remapping shared memory pages according to conditions that data is processed by the DPE and the adjacent DPEs; and selectively connecting a remapped shared memory page to one of the adjacent DPEs so that the adjacent DPEs access to the shared memory pages.

15. The method of claim 14, wherein the remapping of the shared memory pages comprises:

assigning one of the shared memory pages to a first DPE of the adjacent DPEs so that data generated by the first DPE, which performs a task prior to a task performed by the DPE, is stored in the DPE; and assigning one of the shared memory pages to a second DPE of the adjacent DPEs so that data generated by the DPE is used in the second DPE, which performs a task subsequent to a task performed by the DPE.

16. The method of claim 14, further comprising:

connecting the DPE to a remapped shared memory page of a third DPE of the adjacent DPEs so that data generated by the DPE is stored in the third DPE, which performs a task subsequent to a task performed by the DPE.

17. The method of claim 14, further comprising:

remapping a virtual page according to conditions that data are processed by the DPE and the adjacent DPEs; and selectively connecting the virtual page to one of the adjacent DPEs so that the DPE accesses to a shared memory page of the connected adjacent DPE.

18. A DPE in a parallel processing system comprising a plurality of DPEs for parallel processing multimedia data, the DPE comprising:

a data processing unit (DPU) comprising one or more local memory pages and a shared memory page shared by the DPE and DPEs that are adjacent to the DPE, the DPU remapping shared memory pages so that data are shared by a DPE and adjacent DPEs according to conditions that data are processed by the DPE and the adjacent DPEs; and a memory routing unit (MRU) selectively connecting a remapped shared memory page to one of the adjacent DPEs so that the adjacent DPEs access to the shared memory pages.

19. The DPE of claim 18, wherein the DPE comprises a plurality of connection units that connect to the adjacent DPEs according to directivity based on a time sequence or a level sequence.

* * * * *